United States Patent
Kalkbrenner et al.

(10) Patent No.: US 12,523,858 B2
(45) Date of Patent: Jan. 13, 2026

(54) METHOD AND APPARATUS FOR LOCALIZING OBJECTS BY MEANS OF A LIGHT SHEET

(71) Applicant: CARL ZEISS MICROSCOPY GMBH, Jena (DE)

(72) Inventors: Thomas Kalkbrenner, Jena (DE); Jörg Siebenmorgen, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 531 days.

(21) Appl. No.: 18/166,773

(22) Filed: Feb. 9, 2023

(65) Prior Publication Data
US 2023/0251480 A1   Aug. 10, 2023

(30) Foreign Application Priority Data
Feb. 9, 2022   (DE) ..................... 10 2022 201 352.2

(51) Int. Cl.
*G02B 21/36*   (2006.01)
*G02B 21/06*   (2006.01)

(52) U.S. Cl.
CPC .......... *G02B 21/367* (2013.01); *G02B 21/06* (2013.01)

(58) Field of Classification Search
CPC ...... G02B 21/18; G02B 21/367; G02B 21/06; G02B 21/0032; G02B 21/0076
See application file for complete search history.

(56) References Cited

U.S. PATENT DOCUMENTS

| 10,024,793 | B2 | 7/2018 | Ritter et al. |
| 10,989,909 | B2 | 4/2021 | Siebenmorgen |
| 11,300,771 | B2* | 4/2022 | Kalkbrenner .......... G02B 21/26 |

(Continued)

FOREIGN PATENT DOCUMENTS

| DE | 102013208926 A1 | 11/2014 |
| DE | 102018207821 A1 | 11/2019 |
| WO | 2016189012 A1 | 12/2016 |

OTHER PUBLICATIONS

Girkin, et al., "The Light-Sheet Microscopy Revolution", IOP Publishing; Journal of Optics; J. Opt. 20, 053002; https//doi.org/10.108820408986/aab58a, 2018, 21 pages.

(Continued)

*Primary Examiner* — Jia X Pan
(74) *Attorney, Agent, or Firm* — Brake Hughes Bellermann LLP

(57) ABSTRACT

Techniques an apparatuses for localizing objects of a sample that emit detection radiation are disclosed. At least one light sheet is produced in a light sheet plane and a region of the sample to be imaged is illuminated with the light sheet and detection radiation from the sample is spatially resolved in a detection plane. A light sheet is produced that has, in the light sheet plane, a non-illuminated light sheet section delimited by an illuminated light sheet section or is produced sequentially in the light sheet plane, where a non-illuminated light sheet section remains between the sequentially produced light sheets. An object to be localized is present in the non-illuminated region, and a position of the object is captured if it leaves the non-illuminated region and is excited to emit the detection radiation by one of the light sheets delimiting the non-illuminated region.

7 Claims, 7 Drawing Sheets

(56) References Cited

U.S. PATENT DOCUMENTS

2014/0340483 A1* 11/2014 Ritter .................... G02B 27/58
348/46
2019/0170995 A1* 6/2019 Siebenmorgen ... G02B 21/0076

OTHER PUBLICATIONS

Ritter, et al., "Light Sheet Microscopy for Single Molecule Tracking in Living Tissue", Plos One; vol. 5, Issue 7, e11639; Single Molecule LSFRM; www.plosone.org, Jul. 2010, 9 pages.

Ruthardt, et al., "Single-Particle Tracking as a Quantitative Microscopy-Based Approach to Unravel Cell Entry Mechanisms of Viruses and Pharmaceutical Nanoparticles", The American Society of Gene & Cell Therapy; Molecular Therapy, vol. 19, No. 7; SPT for Elucidating Virus and Nanoparticle Entry, Jul. 2011, pp. 1199-1211.

* cited by examiner

METHOD AND APPARATUS FOR LOCALIZING OBJECTS BY MEANS OF A LIGHT SHEET

CROSS REFERENCE TO RELATED APPLICATION

This application claims the benefit of German Application No. 10 2022 201 352.2, filed Feb. 9, 2022, the disclosure of which is incorporated herein by reference in its entirety.

TECHNICAL FIELD

This disclosure relates to a method and to an apparatus for localizing objects.

BACKGROUND

With the configurations of what is known as light sheet microscopy (single plane illumination microscopy), thin two-dimensional regions ("slices") of a sample to be imaged can be illuminated and detection radiation that is brought about in the process can be captured. One advantage of this microscopy technique is that the sample is being spared, in particular in the case of biological samples, because only a small volume of the sample is illuminated in each case. For example, if fluorophores have been introduced into a sample, substantially only those fluorophores are excited during an illumination time period that are located in the volume of the light sheet and whose detection radiation is captured by means of a suitable detector (for example: Girkin et al. (2018): The light-sheet microscopy revolution, Journal of Optics, 20 (5), 053002).

In addition to imaging the object, the aim in the field of medical and biological research is also often the capturing of movements of marked objects over a period of time ("tracking") (for example: Ruthardt et al. (2011): Single-particle tracking as a quantitative microscopy-based approach to unravel cell entry mechanisms of viruses and pharmaceutical nanoparticles. Molecular therapy, 19 (7), 1199-1211; and Ritter et al. (2010): Light sheet microscopy for single molecule tracking in living tissue, PloS one, 5 (7), e11639).

However, if an object that is marked with a fluorophore is tracked over a relatively long period of time, what is known as bleaching constitutes a disadvantage. In particular, if individual fluorescence molecules (fluorophores) are used as probes, only a limited budget of photons is available for detection before the fluorescence molecule is bleached and it transitions into an irreversible dark state.

By way of "tracking", for example, it is possible to examine a directional movement of the object to be tracked along other structures, such as the cytoskeleton. In addition, it is possible, for example, to image free diffusion of an object in the form of movement data. Since all these examinations preferably take place in living cells or organisms, the avoidance of photodamage is of great importance. The use of a light sheet is therefore advantageous.

SUMMARY

The invention is based on the object of proposing an improved option for three-dimensionally localizing objects and for spatio-temporally tracking them.

The object is achieved by a method in accordance with the independent claim and by an apparatus in accordance with the additional independent claim. Advantageous refinements are the subject matter of the dependent claims.

The object is achieved by a method for localizing objects emitting detection radiation by means of illumination with a light sheet. For this purpose, illumination radiation, by means of which at least one light sheet is produced in a light sheet plane spanned by a $Z_i$ axis and, aligned transversely thereto, a $Y_i$ axis, is guided along the $Z_i$ axis and a region of a sample to be imaged is illuminated with the light sheet. Detection radiation brought about by the action of the light sheet is captured in a spatially resolved manner in an image plane along an optical axis of a detection beam path that is aligned substantially perpendicular to the light sheet plane and the point of origin of captured detection signals is determined (localized). The image plane or detection plane is here, for example, a detector plane of a detector in which a plurality of individual detector elements are arranged.

A method according to an implementation is characterized in that a non-illuminated region, which is delimited by light sheets formed in the light sheet plane, is realized in the light sheet plane. In a first alternative, this can be accomplished by a light sheet being produced which, in the light sheet plane, has a non-illuminated light sheet section (from now on also referred to in short as non-illuminated region), which is delimited in the direction of the $X_i$ axis by in each case one illuminated light sheet section. The non-illuminated region is embedded between the two light sheet sections in the direction of the $X_i$ axis, that is to say in the direction of the detection beam path. Such a light sheet will also be referred to as an inverse light sheet below.

In a second alternative of the method according to an implementation, in each case one light sheet is produced sequentially in the first light sheet plane, wherein a non-illuminated light sheet section remains between the sequentially produced light sheets in the direction of the $X_i$ axis. The recording time points and capturing time periods of a detector used for capturing detection radiation are correspondingly adapted to the sequential switching regime and synchronized.

So, in both implementations, a sequence formed by a first light sheet (section), the non-illuminated region and a second light sheet (section) is produced in the detection direction ($X_i$ axis or $Z_c$ axis, see below), perpendicular to the light sheet plane.

The light sheet plane extends virtually at the center of the non-illuminated region and is flanked by the light sheet sections or the light sheets (for simplification reasons, the following text will also merely refer to light sheets). The entirety of the inverse light sheet or of the combination of the non-illuminated region and the sequential light sheets is understood to have been produced in the light sheet plane.

For carrying out the method according to an implementation, the illumination is set, in particular, directed, in such a way that an object to be localized is present in the non-illuminated region. The position of the object is captured if it leaves the non-illuminated region and is excited to emit the detection radiation by one of the light sheets delimiting the non-illuminated region.

The core of the concept is to expose an object to be tracked to illumination radiation only occasionally in order to be able to maintain its available photon budget for a long time and to use it effectively. In doing so, the object is caused to emit detection radiation not continually but only at short time intervals. The actual time intervals are dependent here on the individual movement of the object to be tracked, in particular on its respective direction and speed. For example, the time intervals can be influenced by the selection of the dimensions of the non-illuminated region in the detection direction (thickness) and the utilized wavelengths and/or radiation intensities of the illumination radiation forming the light sheets.

The inverse light sheet to be produced in the first light sheet plane (first alternative) or the sequentially produced light sheets (second alternative) can be typical Gaussian light sheets, but it is advantageous to produce and use, for example, structured light sheets. A structured light sheet of this type can be produced by a plurality of non-diffraction-limited beams, for example Bessel beams, being produced and arranged next to one another in one plane. The distances between the beams and the properties thereof are in this case chosen such that undesired illumination effects above and below the light sheet plane containing the beams, due to destructive interferences, are reduced or largely eliminated.

In a further possible configuration of the method according to an implementation, a light sheet section or a light sheet can be realized by it being produced by means of sinc beams, in particular by means of sinc2 beams or sinc3 beams, (for example using ideal low-pass filters, for example, sinc filters in three axial directions; see in this respect DE 10 2012 013 163 A1).

Optionally, the beams can be moved in the light sheet plane in the direction of the Yi axis to produce a homogeneous light sheet.

Detection radiation emanating, for example, from an object to be tracked can be captured by means of a spatially resolving detector. Such a detector can be, for example, a CCD, CMOS or sCMOS camera or a SPAD array (SPAD: single photon array diode). In principle, the object field can also be scanned point by point or line by line by virtue of the fact that the plane illuminated by the light sheet or a section thereof is scanned by means of a beam-directing apparatus such as a scanner, a micromirror array or a spatial light modulator (SLM).

The detection radiation that is captured is advantageously emitted fluorescence radiation, because the latter can be predetermined in a targeted manner via the selection of the fluorophores used and the fluorophores can be placed as needed into an excitable state (see below) in a targeted manner. The detection radiation that is captured can also be reflected illumination radiation, but assigning the latter to a specific object is more difficult.

An object that is to be tracked may be, for example, a fluorescent particle (bead) or a quantum dot, which are functionalized and are bound, for example, to biomolecules, for example, to proteins. For example, these biomolecules may be what are known as motor proteins, which include, for example, kinesin, dyneins, myosin, tropomyosin and prestin. However, in particular, individual molecules provided with a marker (for example, a fluorophore) can also be used.

In order to be able to set the location and/or extent of the non-illuminated region in a manner such that an object to be localized is present therein, various approaches can be taken. For example, an object of interest can be localized in the sample or in the light sheet plane. The non-illuminated region is positioned on the basis of the localization. It is also possible that the non-illuminated region is positioned randomly or in line with an expected probability or by using an overview image. For example, the non-illuminated region can be shifted laterally and/or vertically in the light sheet plane until a suitable object has been found. Once an object to be tracked has been localized, the actual tracking can begin.

The fact that the exact position and extent both of the non-illuminated region and also of the light sheets of both alternatives is known at all times contributes to the determination of the position of the object in the direction of the optical axis of the detection beam path (Z direction of the detection; position Zc; direction of the Zc axis) at the moment at which the object leaves the non-illuminated region and is excited to emit detection radiation due to the effect of the illumination radiation of a light sheet. As will be explained below, it is possible in advantageous configurations of a method according to an implementation to ascertain a coordinate Zc, which corresponds to the two-dimensional position of the object in the detection plane spanned by the mutually orthogonal axes Xc and Yc. The index "c" stands for "camera" and denotes the axes or the coordinates of a coordinate system of the detection beam path.

A differentiation and transformation of different coordinate systems is indicated in particular if the optical axes of the illumination beam path and of the detection beam path are directed obliquely to a sample plane serving as reference plane.

Once an object to be tracked has been localized and is currently situated in the region of a light sheet, it is possible in one configuration of a method according to an implementation, after detection radiation has been captured and the position of the object has been captured, to change the position of the non-illuminated region in a controlled manner such that the object is once again situated in the non-illuminated region.

It is now possible to wait for the object, due to its movement, to once again pass into a region illuminated by a light sheet section or, respectively, by a light sheet. The relevant coordinates of the object that is again excited to emit the detection radiation are ascertained and captured together with an associated time and preferably stored. Next, the position of the non-illuminated region is again changed in a controlled manner so that the object is once again situated in the non-illuminated region. In this way, the coordinates captured at the individual times form the path traveled by the object. The movement distances between the individual capturing events can, as necessary, be estimated or extrapolated.

As part of a method according to an implementation, the captured intensities of an excited object can be taken into consideration. The captured intensity values are here, among other things, dependent on the time duration and the intensity of the excitation radiation acting on the object. In addition, the captured intensity is influenced by the recording duration, for example, of an image (frame).

It is conceivable that an object to be tracked moves exactly or substantially in the direction of the longitudinal extent of the non-illuminated region, that is to say approximately in the direction of the optical axis of the illumination beam path. In this case, the object does not pass into an illuminated region or does so only after long distances and correspondingly long time periods. In order to increase the probability of the object being captured, it is possible in a further configuration of a method according to an implementation to shift, one or more times, the positioning of the non-illuminated region, in particular during image capturing, by a fraction of its extent in the detection direction (e.g., to create a "wobble" movement). Such a shift takes place in the detection direction, that is to say orthogonally to the light sheet plane. The fraction can here amount to no more than half the clear width (thickness) of the region between the light sheet sections or between the light sheets, for example. The wobble movement can continue after an object has been captured. However, it is also possible for the wobble movement to stop after the object has been captured and to merely position the non-illuminated region such that the object is once again situated in the non-illuminated region. As a result, it is possible in this way to also capture and localize objects that move along the non-illuminated region.

In a further configuration of a method according to an implementation, a structured light sheet having a number of illuminated segments is produced in the non-illuminated region, between which segments non-illuminated regions are located (see also: US 2009/0073563 A1, DE 10 2012 013 163 A1). The illuminated segments extend, for example, in the illumination direction. Due to the effect of such a configuration, in particular, of the inverse light sheet, the non-illuminated region is divided into a number of non-illuminated partial regions, which are delimited by illuminated partial regions. The probability that an object is excited to emit the detection radiation by one of the illuminated segments in that case also rises considerably even if the object to be tracked moves only within the light sheet plane at the height of the non-illuminated region.

Such a modification of, in particular, an inverse light sheet can be effected, for example, by a suitable superposition of the light sheet sections and of the structured light sheet. For this purpose, two illumination beam paths may be present. In further configurations, inverse and structured light sheets can be generated together using a beam shaper, for example, by means of an SLM (spatial light modulator).

Such a configuration can optionally also be combined with a wobble movement of the light sheet according to the first or the second alternative in the light sheet plane.

The accuracy of the ascertainment of the Zc position of the object can be impacted by a periphery of the relevant illuminated region that has been produced with a blur. It is also possible that during its capture, the object has already moved into the illuminated region by some distance. It is therefore possible in a further possible configuration of a method according to an implementation to form a point spread function of the detection beam path (also referred to below as detection PSF) in the form of an asymmetric detection PSF. In this case, a manifestation of the asymmetric detection PSF of a captured image point in the detection plane is used to ascertain a Zc position of the point of origin of the relevant image point. The manifestation of the asymmetric detection PSF of the image point of a point of origin can be ascertained, for example, by using the distribution of the captured intensities of a plurality of detector elements in a known manner.

In order to be able to efficiently utilize the photon budget of an object to be tracked, the latter can be provided, or can have been provided, with a marker that can be brought from an initial state into an excitable state using radiation having a switching wavelength. In the excitable state, the marker can be excited to emit detection radiation by means of radiation having an excitation wavelength, and as a result the object to be tracked can be captured and localized. The radiation having the switching wavelength is advantageously radiated into the light sheet plane in the form of a dynamic or static light sheet.

In a more developed configuration, the marker can be brought back into the initial state by means of a switching wavelength. The switching wavelength can here, for example, be radiation having the excitation wavelength and/or radiation having a de-excitation wavelength that differs therefrom. The option of being able to switch a marker several times increases the flexibility of the method and enables efficient utilization of the photons that are available per marker molecule.

For example, the light sheet of the radiation having the switching wavelength can be radiated into the non-illuminated region over a specific time period in order to switch marked objects that are situated there, more specifically: the switchable marker molecules that are bound to an object. After a number of objects have been switched, the illumination with the light sheet having the switching wavelength can be terminated again. This is similarly true for switching the object into the initial state.

A method according to an implementation can be carried out using a light sheet microscope having an illumination beam path and a detection beam path. The illumination beam path includes at least one light source for providing illumination radiation and at least one beam shaper for producing a light sheet in a light sheet plane. The detection beam path has a spatially resolving detector in an image plane (detector plane).

A light sheet microscope according to an implementation is characterized in that a controller is present which is configured for localizing objects emitting detection radiation. For this purpose, control commands are generated by means of the controller. When carrying out the control commands, the beam shaper produces, in a first alternative, an inverse light sheet (see above), which has a non-illuminated region delimited by in each case one illuminated light sheet section in the light sheet plane in the direction of the Xi axis (corresponds to the direction of the Zc axis). For example, a spatial light modulator can be used as the beam shaper. The microscope can be an upright microscope or an inverted microscope.

In the second alternative of the method, the beam shaper sequentially produces, when carrying out the control commands, in each case one light sheet, wherein a non-illuminated region remains between the sequentially produced light sheets in the direction of the Xi axis.

In order to carry out a method according to an implementation with the light sheet microscope, the configuration of the controller causes the illumination to be directed such that an object to be localized is present in the non-illuminated region and the non-illuminated region can be repeatedly positioned in relation to the object to be tracked as was already described above. The position of the object is captured if it leaves the non-illuminated region and is excited to emit the detection radiation by one of the light sheets delimiting the non-illuminated region or by one of the segments of the structured light sheet that may optionally be present.

The positioning of the non-illuminated region can be adjusted if the detection radiation of an object is captured. In this case, the signal intensity of the captured detection radiation can additionally be ascertained and used as a controlled variable. The signal strength is dependent here, among other things, on the amount of time for which the object excited to emit the detection radiation is under the influence of one of the light sheets during a capture interval of the detector.

The controller is, for example, a correspondingly configured computer or a CPU.

According to one of the two alternatives, the illumination beam path can have, in addition to a light source for light sheet generation, at least one further light source through which radiation having a switching wavelength is provided.

BRIEF DESCRIPTION OF THE DRAWINGS

Implementations are explained in more detail below on the basis of exemplary embodiments and figures. In the figures.

DETAILED DESCRIPTION

Figure 1:
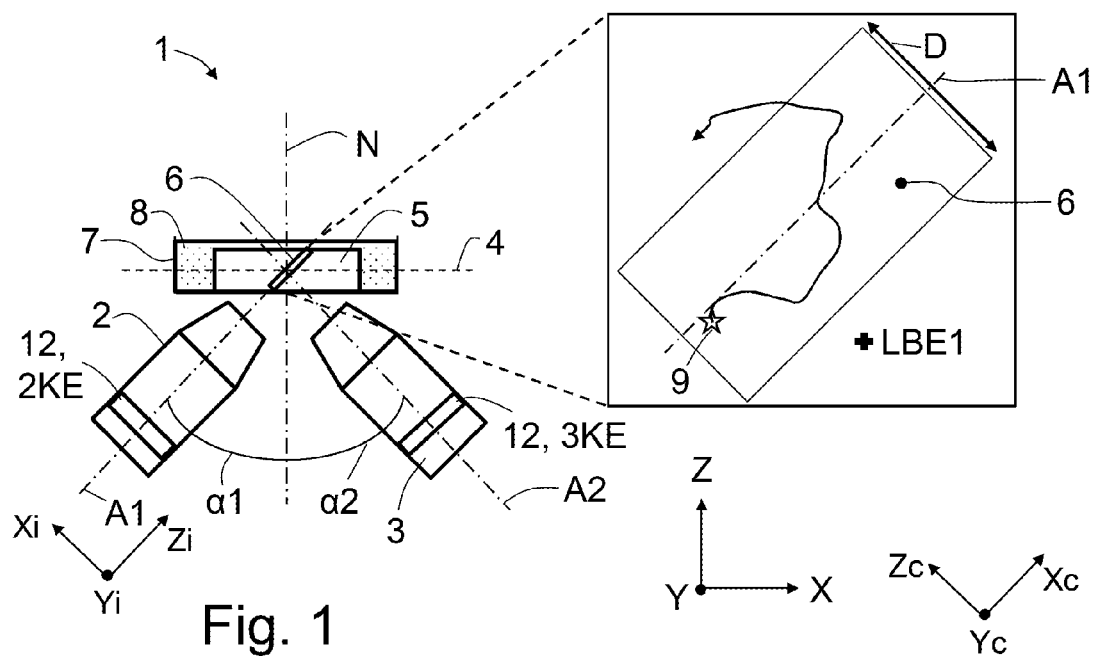
FIG. 1 shows a schematic illustration of a spatio-temporal tracking of an object by means of a light sheet microscope according to the prior art.

Reference signs used in the following figures and exemplary embodiments in each case denote the same technical elements. The depictions are not to scale. For the sake of clarity, the configurations of methods according to implementations will be explained mainly without the technical elements that are necessary therefor.

For description purposes, three coordinate systems with mutually orthogonal axes will be used below. The first coordinate system is the coordinate system of a light sheet microscope 1 with an X axis X, a Y axis Y and a Z axis Z.

The second coordinate system is the coordinate system of an illumination objective 2 with an Xi axis Xi, a Yi axis Yi and a Zi axis Zi. The index "i" stands for "illumination." The illumination radiation BS propagates in the direction of the axis Zi. The light sheet 6 is produced in a light sheet plane LBE, which extends in a plane spanned by the axes Yi and Zi.

The third coordinate system is the coordinate system of a detector 19 (see FIG. 7) with an Xc axis Xc, a Yc axis Yc and a Zc axis Zc. An image representation of, for example, an image on the detector 19 has the coordinates Xc and Yc. The axes Y and Yc are directed orthogonally in relation to the plane of the drawing of the figures in both coordinate systems. The two other axes X and Xc and Z and Zc, respectively, can be transformed into one another by way of a rotation about the Y axis Y.

One possibility known from the prior art of tracking an object 9 in a sample 5 by using a light sheet microscope 1 is shown schematically in FIG. 1. In an inverted embodiment of the light sheet microscope 1, a setup of the light sheet microscope 1 includes, according to the prior art, an illumination objective 2 having a first optical axis A1 and a detection objective 3 having a second optical axis A2 which are directed, at an angle α1 and, respectively, α2 of, in each case, 45° in relation to a sample plane 4 and at a right angle in relation to each other, from below onto the sample plane 4. The sample plane 4 extends in an XY plane spanned by the X axis X and the Y axis Y of a Cartesian coordinate system. Similarly, it is true for an upright arrangement (not illustrated).

A sample 5 arranged in a sample region provided therefor in the sample plane 4, which is also used as a reference plane, is situated, for example, on the base of a sample holder 7 that is embodied as a Petri dish. The sample holder 7, in particular the base thereof, is ideally oriented parallel to the XY plane. The sample holder 7 is optionally filled with a medium 8, for example, water or a buffer. The first optical axis A1 and the second optical axis A2 extend in the XZ plane.

A thin light sheet 6 can be produced in the light sheet plane LBE by means of the illumination objective 2. The light sheet plane LBE extends orthogonally to the first optical axis A1 and parallel to a plane Zi-Yi and is perpendicular to the plane of the drawing in a direction of the Y axis Y. The selective illumination of planes of the sample 5 enables a high resolution of the image data obtained. Additionally, the bothersome background fluorescence is significantly reduced and the signal-to-noise ratio is improved as a result thereof. The illumination and detection through the base of the sample holder 7 additionally advantageously prevents contamination of the samples 5.

In order to enable simpler sample preparation in standard sample containers such as multiwell plates, the inverted arrangement shown can be used. In this arrangement, however, it is necessary to correct the aberrations caused by the sample holder 7, which is inclined relative to the optical axes A1 and A2 and present in the form of a cover slip, by using special optical elements. Such optical elements can be correction elements 2KE, 3KE in the illumination beam path and/or in the detection beam path.

The partial detail that is illustrated in enlarged fashion schematically shows the light sheet 6, which has a thickness D in the direction of the Xi axis or Zc axis. In the region that is currently illuminated by the light sheet 6, an object 9 (illustrated by way of example) is situated, which is provided with a marker that is excited to emit detection radiation DS (see FIG. 7) by the action of illumination radiation BS. The detection radiation DS can be captured and the location adopted by the object 9 at a time of capture can be ascertained (localization), for example as the point of origin of a spot of the captured detection radiation DS. It is therefore possible with multiple capturing of the object 9 and its localization over an observation time period for a path traveled by the object 9 to be recorded, as it is shown by way of example. This excitation of the detection radiation DS takes place regardless of whether an image is actually captured over the respective time period. That means that a significant portion of the available photon budget of the object 9 or the marker is not being used.

Figure 2:
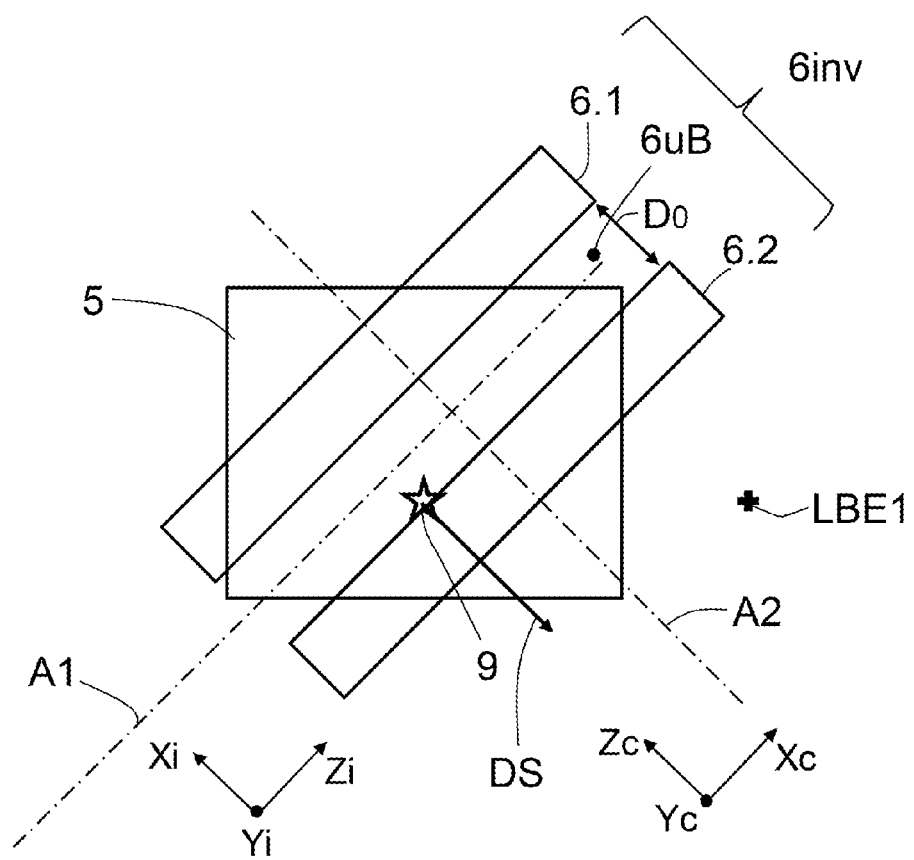
FIG. 2 shows a schematic illustration of a first configuration of the method according to an implementation by producing and using an inverse light sheet with a non-illuminated region in a top view of a light sheet plane.

FIG. 2 shows a first configuration of a method according to an implementation. An inverse light sheet 6inv is produced along the optical axis A1 of the illumination beam path. In the embodiment variant shown, this light sheet has a first light sheet section 6.1, a second light sheet section 6.2, and, interposed between them, a non-illuminated region 6uB. The two light sheet sections 6.1, 6.2 delimit the non-illuminated region 6uB in the direction of the Xi axis or the Zc axis. For simplification reasons, the following text will refer to the direction of the Zc axis. The non-illuminated region 6uB has a width DO in the direction of the Zc axis.

The inverse light sheet 6inv is set in terms of its position, that is to say its location and extent, such that the object 9 to be observed and tracked is situated in the non-illuminated region 6uB and is not excited to emit detection radiation DS.

If due to its inherent movement the object 9 passes into the region of one of the two light sheet sections 6.1 and 6.2, the emission of the detection radiation DS is brought about by the action of the illumination radiation BS, which in this case serves as excitation radiation. For example, the detection radiation DS is fluorescence radiation.

The detection radiation DS is captured by means of a spatially resolving detector 19 (see FIG. 7), and the point of origin of the detection radiation DS, and thus the 2D coordinates of the object 9 in the Xc-Yc, plane is/are ascertained.

After the object 9 has been localized, the orientation of the inverse light sheet 6*inv* in the light sheet plane LBE is changed so that, as a result, the object 9 is once again situated in the non-illuminated region 6*u*B and no further detection radiation DS is excited. In this case, it is also possible on the basis of the required travel and the direction thereof for reaching the changed position of the inverse light sheet 6*inv* to infer the position of the object 9 in the direction of the Zc axis (Zc position).

In order to capture further individual waypoints of the object 9 and to reconstruct or derive therefrom a path traveled by the object 9, the 2D coordinates and optionally the Zc coordinates of the location at which the object 9 once again passes into one of the light sheet sections 6.1 and 6.2 are again captured.

In order to ascertain the Zc position of the object 9 more precisely, it is also possible in further configurations of a method according to an implementation to produce an asymmetric point spread function (PSF), as will be explained by way of example in relation to FIG. 7.

Figure 3A:
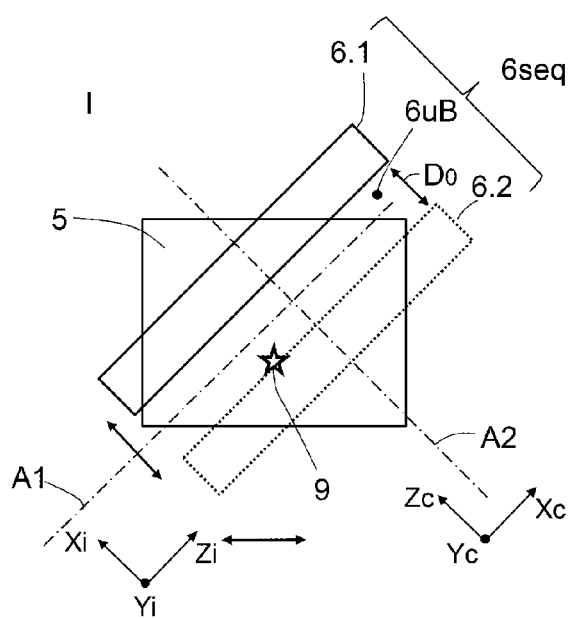
FIGS. 3a and 3b each show a schematic illustration of a second configuration of the method according to an implementation by producing and using sequentially produced light sheets with an interposed non-illuminated region in two operating states I and II in a top view of a light sheet plane.
Figure 3B:
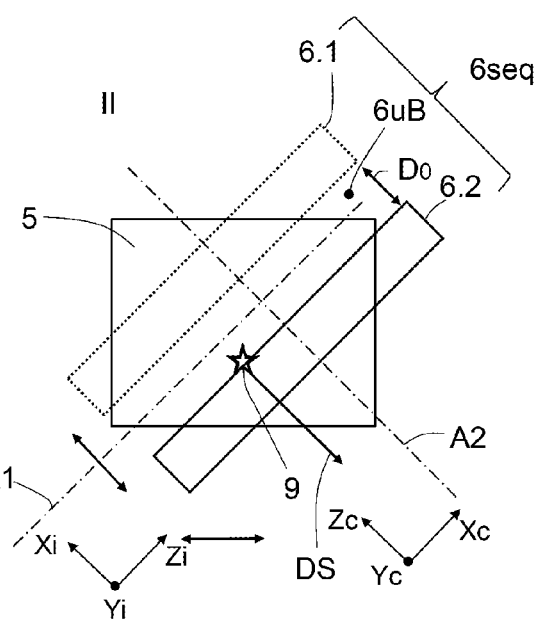

The current Zc position of the object 9 can be ascertained in a second configuration of a method according to an implementation by sequentially, that is to say, one after the other temporally, producing the light sheet sections 6.1 and 6.2 (FIGS. 3*a* and 3*b*). In this case, in the second configuration, the light sheet sections 6.1 and 6.2 can be produced in each case in the form of conventional, for example Gaussian, light sheets. As a result, a non-illuminated region 6*u*B is once again situated between the light sheet sections 6.1 and 6.2. The light sheet sections 6.1 and 6.2 and the non-illuminated region 6*u*B together form a sequential light sheet 6*seq*.

In a first operating state I, only the first light sheet section 6.1 is produced and radiated into the light sheet plane LBE (FIG. 3*a*). For better orientation, the non-produced second light sheet section 6.2 is illustrated with an interrupted full line. In the situation illustrated, the object 9 is not situated in the region of the first light sheet section 6.1 and is therefore not excited to emit the detection radiation.

In the second operating state II (FIG. 3*b*), the first light sheet section 6.1 is switched off (illustrated with an interrupted full line) and only the second light sheet section 6.2 is produced and radiated into the light sheet plane LBE. In the situation shown, the object 9 is situated in the region of the second light sheet section 6.2 and is excited to emit the detection radiation DS. As described previously, the 2D coordinates of the point of origin of the captured signal of the object 9 can be ascertained. Since it is additionally known which of the two light sheet sections 6.1 and 6.2 was radiated in at the point of capture, it is possible on the basis of its position and extent to ascertain the Zc position of the object 9.

Figure 4A:
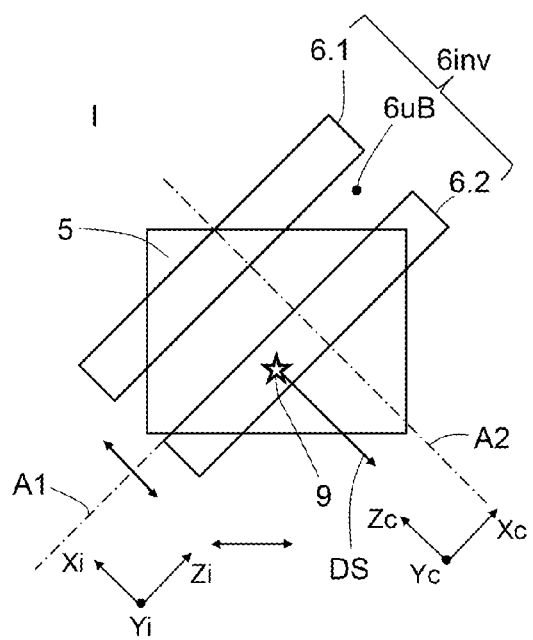
FIGS. 4a and 4b each show a schematic illustration of a third configuration of the method according to an implementation by producing and using an inverse light sheet and an additional lateral movement in two operating states I and II in a top view of a light sheet plane.
Figure 4B:
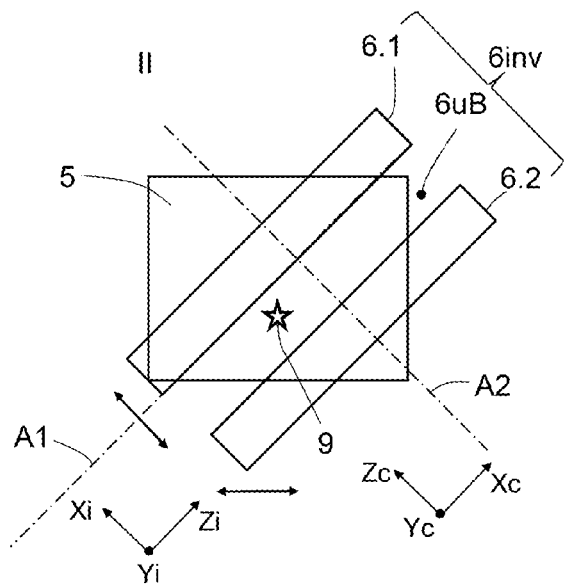

In unfavorable setups, it may be the case that an object 9 to be tracked moves entirely or substantially along the non-illuminated region 6*u*B without coming into contact with either of the light sheet sections 6.1 and 6.2. In order to be able to detect even such objects 9, it is possible in a third configuration of a method according to an implementation for the position of the light sheet sections 6.1, 6.2 to be shifted multiple times in the light sheet plane LBE. This shift in the direction of the Zc axis, which is also referred to as "wobble movement," is shown in FIGS. 4*a* and 4*b*.

In a first operating state I, the light sheet sections 6.1 and 6.2 are shifted in the direction of the Zc axis until the second light sheet section 6.2 comes to lie at the virtual line of the first optical axis A1. The second light sheet section 6.2 has therefore passed over half of the original extent of the non-illuminated region 6*u*B in the direction of the Z axis (FIG. 4*a*).

In an opposite movement, the light sheet sections 6.1, 6.2 are shifted until it is now the first light sheet section 6.1 that covers the hitherto non-illuminated half of the non-illuminated region 6*u*B and virtually lies at the first optical axis A1 (second operating state II). In this way it is possible by shifting the inverse light sheet 6*inv* in the direction of the Zc axis to force capturing of the object 9.

Such a shifting (wobble) movement can be produced firstly by the light sheet sections 6.1, 6.2 being shifted by way of corresponding control of a beam-steering apparatus in the illumination beam path, for example of a scanner 17 and/or a beam shaper 16, for example an SLM, in relation to the first optical axis A1 (symbolically shown by the double-headed arrow perpendicular to the first optical axis A1). It is also possible to move a sample stage 11 by means of a correspondingly controlled actuator 11.1 (see FIG. 7) in the direction of the X axis (illustrated by the horizontally pointing double-headed arrow).

With knowledge of the current shifted location and the currently prevailing shift direction of the inverse light sheet 6*inv*, it is additionally possible to ascertain the Zc position of the object 9 at the time of its capture. For example, it is possible to ascertain that the object 9 shown in FIG. 4*a* must be excited to emit the detection radiation DS through the action of the second light sheet section 6.2.

Figure 5:
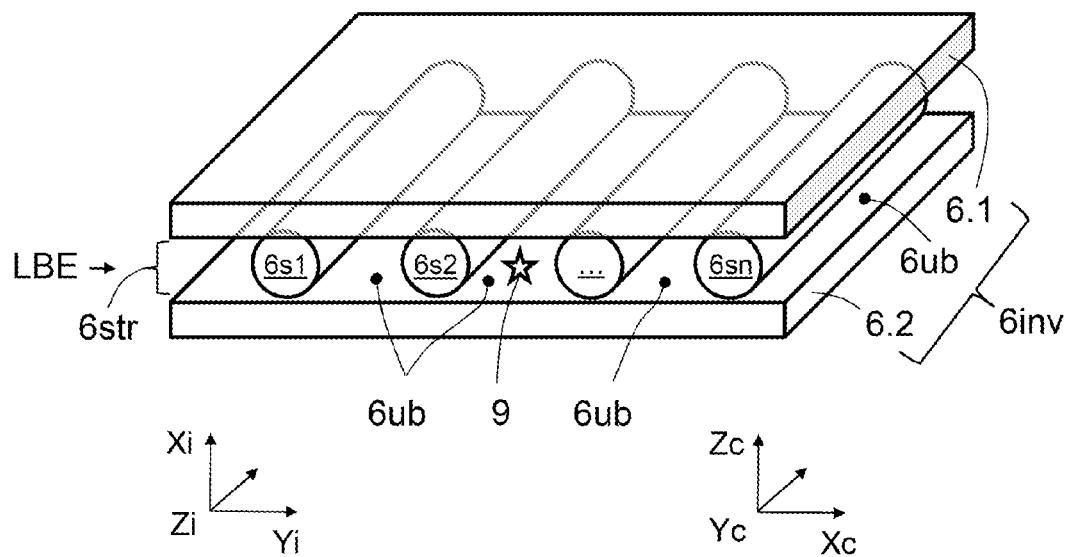
FIG. 5 shows a schematic illustration of a fourth configuration of the method according to an implementation with an inverse light sheet and a structured light sheet.

In a fourth configuration of a method according to an implementation, illuminated segments 6*s*1 to 6*sn* which are arranged with a mutual spacing are produced in the non-illuminated region 6*u*B (FIG. 5). The segments 6*s*1 to 6*sn* extend parallel to one another and in the direction of the Zi axis of the illumination objective 2 and are produced with radiation having an excitation wavelength. If an object 9 to be tracked is situated in a remaining part of the non-illuminated region 6*u*B, this method configuration increases the probability of excitation, even if the object 9 moves exactly in the light sheet plane LBE and parallel to the light sheet sections 6.1 and 6.2.

Figure 6:
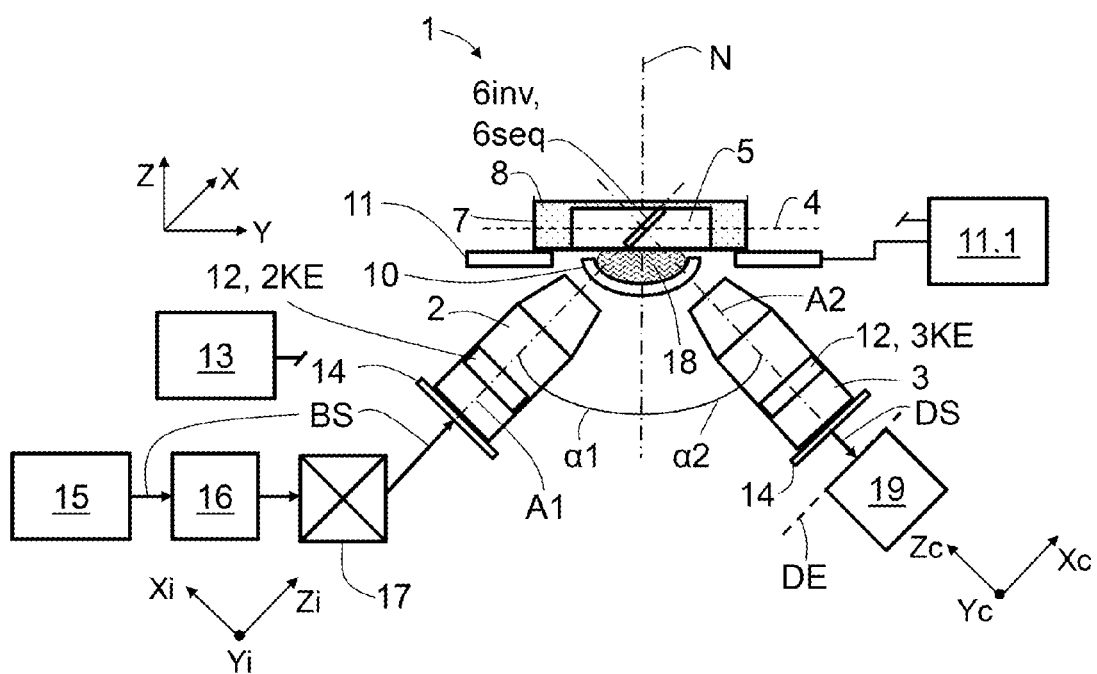
FIG. 6 shows a schematic illustration of an exemplary embodiment of a light sheet microscope that is suitable for carrying out the method according to an implementation.

To realize the various configurations of the methods according to the implementations, a light sheet microscope 1 that has a controller 13 which is configured to carry out the method can be used (FIG. 6).

Such a light-sheet microscope 1 is shown in the embodiment form of an inverse microscope with correction elements 2KE, 3KE and an optical element 10 for the pre-correction of aberrations occurring in the form of a meniscus lens. The angles α1 and α2 between a normal B that is perpendicular to the reference plane 4 and the first optical axis A1 and the second optical axis A2, respectively, are 45° in each case. Alvarez manipulators that consist in each case of two Alvarez plates and actuators 12 and that are arranged in the beam path of the illumination radiation BS and in the beam path of the detection radiation DS are present as adaptive correction elements 2KE, 3KE. The correction elements 2KE, 3KE serve to correct aberrations which may occur on account of the oblique passage of the illumination radiation BS through the base of the sample holder 7. The meniscus lens assists the transition of the illumination radiation BS from air into an immersion medium 18 and into the medium 8 and the transition of the detection radiation DS from the medium 8 into the immersion medium 18 and into the air.

The sample holder 7 is held on the sample stage 11. The sample stage 11 itself is adjustable in a controlled manner in an X-Y plane, spanned by the X axis X and the Y axis Y, by means of actuators 11.1.

The illumination objective 2 and the detection objective 3 are each optionally adjustable in a controlled fashion along the first optical axis A1 and along the second optical axis A2, respectively, by means of in each case one objective drive 14, which is embodied as a piezo-drive in the present case.

The illumination radiation BS is provided by a laser module 15 and shaped by means of a beam shaping 16. The beam shaping 16 is for example an optical unit, by means of which the provided illumination radiation BS is shaped, for example collimated. This may be for example a spatial light modulator (SLM). Using the beam shaping 16, the illumination radiation BS is shaped for example into a number of light sheet sections 6.1 to 6.$n$.

Downstream of the beam shaping 16 there is a scanner 17, by means of which the shaped illumination radiation BS is deflectable in a controlled manner in two directions (X-Y scanner).

Downstream of the scanner 17, the illumination objective 2 is arranged on the first optical axis A1. The illumination radiation BS that is deflected by the scanner 17 reaches the illumination objective 2 and it is further shaped and/or focused by the latter. The light sheet 6$inv$ or 6$seq$ is produced in a sample region in which the sample 5 is situated, by an appropriate deflection of the illumination radiation BS by means of the scanner 17.

The detection radiation DS coming from the sample 5 and from the sample region is directed along the second optical axis A2 onto a detector 19 and can be captured by the latter in a detection plane DE.

For controlling the sample stage 11, the actuators 11.1, the objective drives 14, the correction elements 2KE, 3KE or their actuators 12, the laser module 15, the beam shaping 16, the scanner 17 and/or the detector 19, a control unit 13 is present, which is connected to the elements to be actuated in a manner that is suitable for data transmission (only indicatively shown).

In further embodiments, the control unit 13 is additionally configured to capture, store and/or evaluate measurement values. Further elements and units of the microscope 1 may be controllable by means of the control unit 13 and/or measurement values can be obtained and evaluated thereby.

Aberrations that occur during an oblique passage of the illumination radiation BS through the sample holder 7 are dependent on the thickness thereof. For this reason, the correction elements 2KE, 3KE, for example, are shiftably mounted in the illumination objective 2 and/or the detection objective 3 in order to match an aberration correction to the thickness by shifting the correction elements 12 in relation to one another.

The base of the sample holder 7 represents a separation layer system with at least one layer made of a specified material with a specified thickness, separating a medium 8, in which the sample 5 is situated, from the illumination objective 2 and the detection objective 3. By means of a base area that is aligned parallel to the sample plane 4, the separation layer system is in contact with the immersion medium 18, at least in the region accessible to the illumination objective 2 and the detection objective 3 for illumination and detection purposes, respectively.

Figure 7:
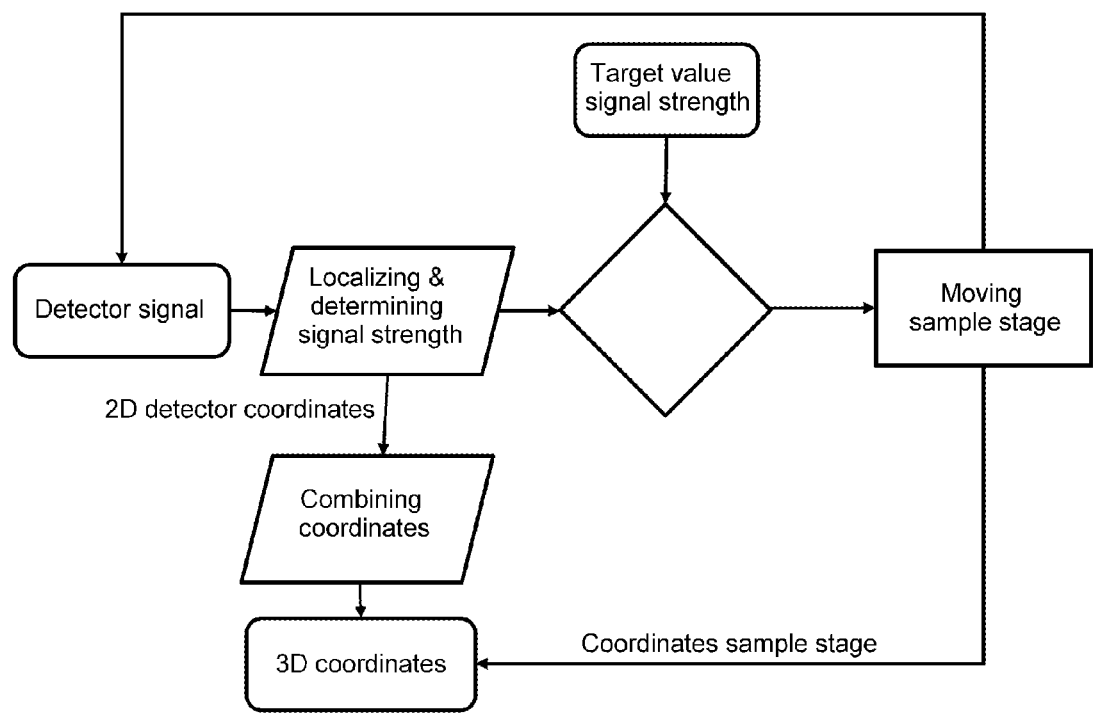
FIG. 7 shows a schematically illustrated control diagram.

FIG. 7 schematically shows a control diagram for a method according to the invention or a microscope 1 according to the invention.

The aim is to keep the object 9 to be tracked in the non-illuminated region 6$u$B and to excite the object 9 only occasionally to emit the detection radiation DS in order to capture points along a path traveled by the object 9.

If the event of such excitation is captured by means of the detector 19, it is possible, depending on the configuration of the method, to carry out two-dimensional or three-dimensional localization of the point of origin of the detection radiation DS. The signal strength captured can be used here as a control parameter. In this way, a target value of the intensity can be defined, starting from which a localization is carried out and/or starting from which the sample stage 11 and/or a repositioning of the non-illuminated region 6$u$B is initiated in order to reduce, for example, an undesired bleaching effect of the object 9. The two-dimensional coordinates of the point of origin can be ascertained in a known manner by means of the two-dimensional detector 19. As stated above, it is optionally possible by using an asymmetric PSF and/or by evaluating the current positional data of the light sheets 6.1, 6.2, of the illuminated segments 6$s$1 to 6$sn$ and/or the known position of the sample stage 11 to ascertain a Zc position of the point of origin at a time of capture and to assign it to the two-dimensional coordinates.

REFERENCE SIGNS

1 Light sheet microscope
2 Illumination objective
2KE Illumination correction element
3 Detection objective
3KE Detection correction element
4 Sample plane (=reference plane)
5 Sample
6 Light sheet
6.1 First light sheet section
6.2 Second light sheet section
6$inv$ Inverse light sheet
6$u$B Non-illuminated region
6$seq$ Sequential light sheet
6$str$ Structured light sheet
6$s$1 to 6$sn$ Illuminated segments (of the structured light sheet 6$str$)
7 Sample holder
8 Medium
9 Object
10 Meniscus lens; optical element (pre-correction)
11 Sample stage
11.1 Actuator (of the sample stage 11)
12 Actuator (of the correction element 2KE, 3KE), Alvarez manipulator
13 Control unit; controller
14 Objective drive
15 Laser module, light source
16 Beam shaping
17 XY scanner
18 Immersion medium
19 Detector
A1 First optical axis (optical axis of the illumination objective 2)
A2 Second optical axis (optical axis of the detection objective 3)

α1 Angle/illumination angle
α2 Angle/detection angle
N Normal
DE Detection plane
D0 Distance (light sheet sections of the inverse light sheet 6*inv*)
LBE Light sheet plane

The invention claimed is:

1. A method for localizing objects of a sample that emit detection radiation, the method comprising:
   radiating illumination radiation in along a Zi axis;
   producing, from the illumination radiation, in a region of the sample to be imaged, at least one light sheet in a light sheet plane spanned by the Zi axis and, aligned transversely thereto, a Yi axis;
   spatially resolving, in a detection plane, detection radiation brought about by interaction of the light sheet with the sample, wherein the detection plane is located along an optical axis of a detection beam path that is aligned substantially perpendicular to the light sheet plane in a direction of an Xi axis;
   determining, from the spatially-resolved detected radiation, a point of origin of captured detection signals from an object in the sample;
   wherein producing the at least one light sheet includes i) producing a light sheet that has, in the light sheet plane, a non-illuminated light sheet section delimited in the direction of the Xi axis by in each case one illuminated light sheet section; or ii) sequentially producing the light sheet sections in the light sheet plane, wherein a non-illuminated light sheet section remains in the light sheet plane between the sequentially produced light sheet sections in the direction of the Xi axis;
   wherein producing the at least one light sheet includes controlling the illumination radiation, such that the object is present in the non-illuminated light sheet section; and
   capturing a position of the object when the object leaves the non-illuminated light sheet section and is excited to emit the detection radiation by one of the light sheet sections delimiting the non-illuminated light sheet section.

2. The method according to claim 1, further comprising, after detection radiation has been captured and the position of the object has been captured, changing the position of the non-illuminated light sheet section a controlled manner such that the object is once again situated in the non-illuminated light sheet section.

3. The method according to claim 1, further comprising shifting a position of the non-illuminated light sheet section in the light sheet plane by a fraction of its extent transversely to the direction of the light sheet plane.

4. The method according to claim 1, further comprising:
   producing a structured light sheet is in the non-illuminated light sheet section; and
   dividing the non-illuminated light sheet section by illuminated segments of the structured light sheet.

5. The method according to claim 1, further comprising:
   imaging a point spread function of the detection beam path as an asymmetric detection PSF; and
   ascertaining, based on a manifestation of the asymmetric detection PSF of a captured image point in the detection plane, a Zc position of the point of origin of a relevant image point along the optical axis of the detection beam path.

6. The method according to claim 1,
   wherein the object includes at least one marker that can be brought from an initial state into an excitable state and/or back from the excitable state into the initial state using radiation having a switching wavelength, wherein the marker in the excitable state can be excited to emit detection radiation by radiation having an excitation wavelength, and
   wherein the at least one light sheet is shaped from the radiation having the switching wavelength and is radiated into the light sheet plane.

7. A light sheet microscope comprising:
   at least one light source configured for providing illumination radiation along a Zi axis;
   at least one beam shaper configured for producing, from the illumination radiation, a light sheet in a light sheet plane spanned by the Zi axis and, aligned transversely thereto, a Yi axis;
   a spatially-resolving detector located in a detector plane along a detection beam path;
   a controller configured for localizing objects emitting detection radiation by providing control commands that cause the microscope to:
   produce a light sheet that has, in the light sheet plane, a non-illuminated light sheet section delimited in a direction of an Xi axis by in each case one illuminated light sheet section or sequentially produce light sheet sections in the light sheet plane, wherein a non-illuminated light sheet section remains in the light sheet plane between the sequentially produced light sheet sections in the direction of an Xi axis;
   direct the illumination radiation in a manner such that an object to be localized is present in the non-illuminated light sheet section; and
   capture a position of the object when the object leaves the non-illuminated light sheet section and is excited to emit the detection radiation by one of the light sheet sections delimiting the non-illuminated light sheet section.

* * * * *